(12) United States Patent
Stridsberg

(10) Patent No.: US 7,196,527 B2
(45) Date of Patent: Mar. 27, 2007

(54) REDUNDANT COMPACT ENCODERS

(75) Inventor: Lennart Stridsberg, Stockholm (SE)

(73) Assignee: Stridsberg Innovation AB, Stockholm (SE)

( * ) Notice: Subject to any disclaimer, the term of this patent is extended or adjusted under 35 U.S.C. 154(b) by 0 days.

(21) Appl. No.: 11/059,546

(22) Filed: Feb. 17, 2005

(65) Prior Publication Data

US 2005/0270040 A1    Dec. 8, 2005

(30) Foreign Application Priority Data

Feb. 17, 2004 (SE) .................................... 0400362
Mar. 8, 2004 (SE) .................................... 0400579

(51) Int. Cl.
*G01R 27/26* (2006.01)
*G01B 7/30* (2006.01)

(52) U.S. Cl. .............................. 324/662; 324/207.15

(58) Field of Classification Search ................ 324/662, 324/210, 207.11, 207.15, 207.16
See application file for complete search history.

(56) References Cited

U.S. PATENT DOCUMENTS

| | | | | | |
|---|---|---|---|---|---|
| 3,196,279 | A | * | 7/1965 | Papelian | ................ 250/237 R |
| 3,281,825 | A | * | 10/1966 | Sanders et al. | ................ 341/15 |
| 4,228,396 | A | * | 10/1980 | Palombo et al. | ............. 324/163 |
| 4,743,902 | A | * | 5/1988 | Andermo | ................ 324/660 |
| 4,803,629 | A | * | 2/1989 | Noto et al. | ................ 701/41 |
| 4,991,301 | A | * | 2/1991 | Hore | ................ 33/366.25 |
| 5,239,307 | A | * | 8/1993 | Andermo | ................ 340/870.37 |
| 5,332,895 | A | * | 7/1994 | Rieder et al. | ........... 250/231.14 |
| 6,339,322 | B1 | * | 1/2002 | Loreck et al. | ................ 324/166 |
| 6,533,076 | B1 | * | 3/2003 | Haverfield et al. | ......... 187/394 |
| 6,747,448 | B2 | * | 6/2004 | Berndt | ................ 324/207.15 |
| 2005/0023451 | A1 | * | 2/2005 | Horton | ................ 250/231.14 |
| 2006/0071672 | A1 | * | 4/2006 | Tola et al. | ................ 324/662 |

\* cited by examiner

*Primary Examiner*—Anjan Deb
(74) *Attorney, Agent, or Firm*—Birch, Stewart, Kolasch & Birch, LLP (57) ABSTRACT

A position transducer for a rotary member such as the rotor of a motor has a rotating encoder disc and flat, disc-shaped elements interacting with the encoder disc to produce position dependent signals. The encoder disc has at least one active element such as metal surfaces configured so that signals from one of several portions or sectors of the encoder system are not transferred to another portion or sector, thus permitting the position transducer to be split into several position detectors that can operate independently of each other without having signals from one position detector affecting the other position detectors. The position detectors can cover individual circular sectors or concentric rings and e.g. be based on sensing the capacitive coupling between transmitter and sensor electrodes located on opposite sides of the encoder disc. The components of the transducer can be assembled with substantial air gaps between them and be made from materials that are not easily destroyed by corrosion and contaminants like dust particles, water, oil or lubricant grease. The position transducer also permits detecting multiturn rotation without additional mechanical components.

25 Claims, 8 Drawing Sheets

REDUNDANT COMPACT ENCODERS

RELATED APPLICATIONS

This application claims priority and benefit from Swedish patent applications Nos. 0400362-0, filed Feb. 17, 2004, and 0400579-9, filed Mar. 8, 2004, the entire teachings of which are incorporated herein by reference.

TECHNICAL FIELD

The present invention is concerned with position transducers for sensing the position of a rotating part such as a motor shaft. The present application is related to art disclosed in pending U.S. patent application having the title "Actuator and movement linkage system", filed Jan. 28, 2005 for the same applicant as the present application, in published International patent application No. WO 2004/034550 and U.S. Pat. Nos. 6,084,234 and 6,191,415 for the same applicant.

BACKGROUND AND PRIOR ART

Many motor systems with very high reliability requirements require position transducers that have a very low probability for failure. In some cases such as the system shown in the cited U.S. patent application "Actuator and movement linkage system", the same shaft may be run by more than one processor. Each of these processors is capable of controlling the same motor windings. In the case where a first processor fails, a stand-by processor may take the control. In order reduce the likelihood of failure of a common part, it is advantageous to have electrically separate angular transducer systems with a minimum of common parts.

Most motors have a protruding shaft in one end of the rotor and a bearing in the other, behind which position transducers having small diameters can be assembled. Some motor systems have a large shaft or a bore through the rotor that is occupied by cables, pipes for cooling fluid, transmission shafts that carry torque from an internal combustion engine on one side of the motor to a gears on the other side of the motor or, as shown in the cited International patent application No. WO 2004/034550, an actuator roller screw. Many position transducer principles that perform well for small diameters becomes less attractive when designed to permit a large diameter shaft.

Position transducers having high resolutions are often designed for limited humidity and have reduced or no performance if contaminated by products such as condensed water, oil, grease or particles from wear in friction brakes or gears.

Many position transducers have small air gaps which can be filled with condensed water that in vehicles and aircraft may freeze. Moving motors including transducers in which ice is formed in thin air gaps may cause the parts of the transducers to break or be distorted or be turned away from their calibrated position.

In the case where there is a need to know how many turns the rotor has moved, in most industrial motors space is available for mechanic devices of small diameters that can use cog wheel gears to record a limited number of turns. Industry standard devices can often record movements in within 2048 full turns. Such devices scale badly and may easily break if forced to move with frozen water in the mechanic parts.

SUMMARY

It is an object of the invention to provide a position encoder system that permits at least two redundant encoder systems in a compact package.

It is another object of the invention is to provide an encoder system that can operate inside a hot motor enclosure.

It is another object of the invention is to provide a very compact multi-channel encoder system.

It is another object of the invention to provide a very compact encoder exhibiting a low sensitivity to contamination.

It is another object of the invention to provide a very compact encoder exhibiting a low sensitivity to humidity and to temperatures below the freezing point of water.

It is another object of the invention to provide a very compact encoder permitting that several turns are detected or recorded.

It is another object of the invention to provide a very compact encoder that operates without multiple tracks, thus permitting a single track having large dimensions.

It is another object of the invention is to provide a compact, low cost encoder system having a high resolution.

Thus, generally, a position encoder system for a rotary member such as the rotor of a motor is disclosed, the position encoder system having a rotating encoder disc and one or more flat, disc-shaped elements which interact with the encoder disc to produce position dependent signals. The encoder disc has an element or elements such as metal surfaces or metal areas configured so that signals derived from one of several portions of the encoder system are not transferred to another portion, thus permitting the encoder system to be split into several position transducers in the different portions. Hence the individual position transducers can operate independently of each other without having signals from one transducer affecting the signals from other transducers. The different portions can include adjacent angular sectors or parallel annular regions. Further, the components, in particular the encoder disc and disc-shaped elements which can be parallel boards, of the encoder system can be assembled with substantial air gaps therebetween, and they can be made from materials that are not easily destroyed by corrosion and contaminants like dust particles, water, oil or lubricant grease. The encoder system permits the recording or detecting of multiturn rotations without additional mechanic parts.

Generally, the encoder disc has a track including variations in the properties of the disc or of a material in or upon the disc, the variations appearing periodically in the circumferential direction of the disc with a definite period or pitch. The varying property of the encoder disk that forms the track detected by detector heads or electrodes of the position transducers can include various electrical and/or magnetic properties and the geometrical extension and shape of areas having electrical and/or magnetic properties. The variations can e.g. appear as a substantially sinusoidal variation, the property then e.g. being represented as a quantity or amount that varies periodically in the angular direction.

The property can be basically electrical, such as the radial extension or width of an annular electrically conducting area for allowing detection derived from e.g. the capacitive coupling between opposed electrodes. The track can include variations in the magnetic permeability of the encoder disc that are obtained from materials having different magnetic permeability at low frequencies. It can also include variations in the magnetic permeability of the encoder disc due to eddy current losses in electrically conducting materials of the code disc.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 1:
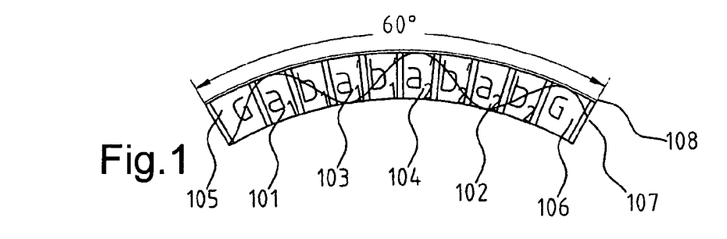
FIG. 1 is a principle drawing of a transmitter electrode group for one of six electrically independent capacitive encoders.

FIG. 1 is a principle drawing of a transmitter electrode group for one of six electrically independent position transducers, also called position encoders or position detectors, with receiver electrodes removed and the encoding disc, also called code disc, indicated as a contour 107. Each position transducer covers 60° of the ring-shaped encoder system.

Figure 2:
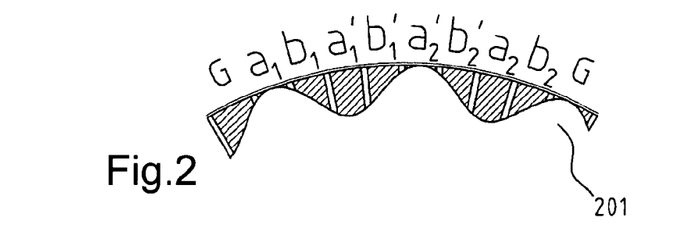
FIG. 2 is a principle drawing similar to FIG. 1 showing the parts of the transmitter electrode group of FIG. 1 that is active with the conducting modulator disc shown.

FIG. 2 shows the parts of the transmitter electrode group of FIG. 1 that are coupled to the receiver electrodes as shielded by an electrically conducting modulator disc 201.

Figure 3:
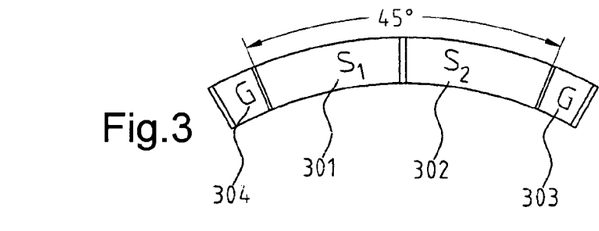
FIG. 3 is a principle drawing of two receiver electrodes and overhearing reduction electrodes for the encoder of FIG. 1.

FIG. 3 is a principle drawing of two receiver electrodes 301, $S_1$ and 302, $S_2$, also called sensor electrodes or simply sensors, and overhearing reduction electrodes 303 and 304 (G) for the encoder of FIG. 1. These extra electrodes G can be connected to ground. The receiver electrodes $S_1$, $S_2$ cover only 45°, leaving a distance or angular sector of (60+45)/2=7.5° to the nearest electrode of another encoder system, this remaining distance occupied by the electrodes G.

Figure 4:
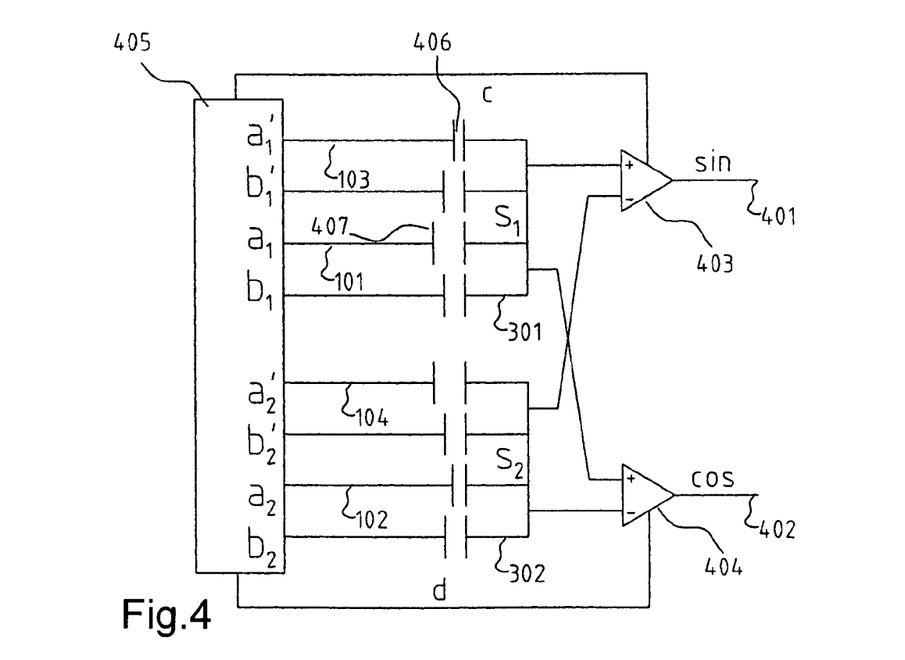
FIG. 4 is a circuit diagram of a position transducer device including the electrodes illustrated in FIGS. 1–3, FIGS. 5*a*–*k* are timing diagrams for signals in various parts of the position transducer device shown in FIG. 4.

FIG. 4 shows the signal generating and decoding electronic circuits required for the position transducer. It consists of a multiphase generator 405 that issues four continuous wave signals, such as sinusoid signals, also called drive signal phases, and two continuous clock signals, all having a rather high frequency like 20 MHz. The drive signal phases a and a' of a first group are 180° out of phase in relation to each other and the drive signal phases b and b' of a second group are 180° out of phase in relation to each other and 90° degrees out of phase in relation to the drive signal phases a, a' of the first group. From the drive signal phases individual drive signals are formed. The drive signals $a_1$ and $a_2$ are electrically identical to each other and correspond to the drive signal a but are connected to different transmitter electrodes. In the same way the drive signals denoted by $a'_1$, and $a'_2$ are electrically identical to each other and correspond to the drive signal a', the drive signals $b_1$ and $b_2$ are electrically identical to each other and correspond to the drive signal b, and the drive signals $b'_1$ and $b'_2$ are electrically identical to each other and correspond to the drive signal b'.

The modulation disc 201, also called encoder disc, can be a metal screen disc, i.e. an electrically shielding disc, or be made from an electrically non-conducting material having a high dielectric constant. FIGS. 1, 2, 8, 9 and 10*a* show a modulation disc including the copper area 201, 801, 802 of a printed circuit board like 805. The electrically conducting area or areas or even the contour or the periphery of the disc forms a track read by the independently operating position detectors, also called detector heads. In FIG. 1, the contour of the copper surface is shown at 107 and the contour of the printed circuit board is shown at 108. Assuming a copper electrode on a printed circuit board, the capacitance of the capacitor 406 formed between the transmitter electrode 103 (connected to drive signal $a_1$') and the first sensor electrode 301, $S_1$ is high because most of the area of the transmitter electrode 103 of FIG. 2 is uncovered by the metal area and the material of the printed circuit board constituting the encoder disc has a dielectric constant about 4 times that of air. This high capacitance is in FIG. 4 shown as a capacitor 406 having a short distance between the electrodes thereof. The transmitter electrode 101 (connected to drive signal $a_1$) is almost totally covered by the metal are of the encoding disc and the capacitance 407 between the transmitter electrode 101 and the same first receiver electrode 301, $S_1$ will therefore be low. This is illustrated by a long distance between electrodes of the capacitor 407 in FIG. 4. The opposite is true for the second sensor electrode 302, $S_2$ as the transmitter electrode 104 (connected to drive signal $a_2$') is covered by the metal area and the transmitter electrode 102 (connected to drive signal $a_2$) is uncovered by the metal area; Therefore the first sensor electrode 301, $S_1$ will have a high coupling to the drive signal phase a' and the second sensor electrode 302 $S_2$ to the drive signal phase a, which, as has indicated above, is the inverse of drive signal phase a'.

The total charge injected in the code disc 201 is basically zero. For example, there is a high coupling between the transmitter electrode 101 (drive signal phase a') and the code disc. There is however an equally good coupling between the code disc and the transmitter electrode 104 (drive signal phase a). As the drive signal phases a and a' are 180° out of phase in relation to each other, the electrical charges injected from the two drive signal phases in the code disc balance each other.

Figures 5A, 5B:
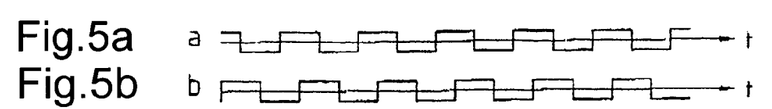

FIGS. 5a–5m show signals corresponding to the code disc position illustrated in FIG. 2. The high coupling between the first sensor electrode 301, $S_1$ and the transmitter electrode 103 carrying drive signal phase a', see FIG. 5c, will cause the state of first sensor electrode 310, $S_1$, see FIG. 5e, to move in phase with the drive signal phase a'. The high coupling between the first sensor electrode $S_2$, see FIG. 5f, and drive signal phase a, see FIG. 5a, will cause the state of the second sensor electrode $S_2$ to move in phase with drive signal phase a. In the code disc position shown, drive signal phase b, see FIG. 5b, and drive signal phase b', see FIG. 5d, will not affect the status of the first sensor $S_1$ as the transmitter electrodes carrying the drive signal phases b and b' have equal coupling to the first sensor $S_1$, and the same is true for the second sensor $S_2$.

Figures 5C, 5D, 5E:
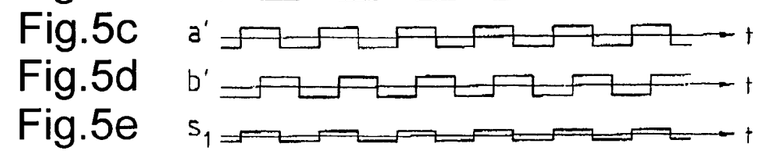
Figures 5F, 5G:
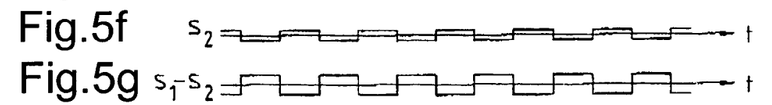
Figures 5H, 5I:
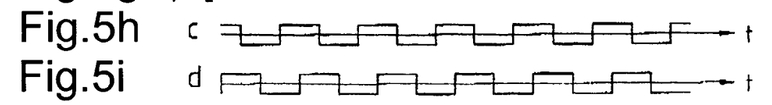
Figures 5J, 5K:
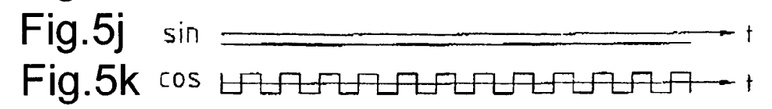

The sensors electrodes $S_1$ and $S_2$ provide sensor signals $s_1$ and $s_2$ and are connected to differential inputs of a first phase sensitive rectifier 403, that will create the difference between the signals on the sensor electrodes $S_1$, $S_2$, shown as "$s_1-s_2$", see FIG. 5g. The phase sensitive rectifier is controlled by a control signal phase c, see FIG. 5h, which is basically identical to drive signal phase a, i.e. has the same frequency and phase position. When the control signal phase c is positive, the phase sensitive rectifier 403 will transfer the signal "$s_1-s_2$" non-inverted, and when the control signal phase c is negative, it is transferred inverted. The resulting output signal on output line 401, shown as "sin" in FIG. 5j, will basically be a DC level as long as the code disc remains in the position shown in FIG. 2.

The sensors $S_1$ and $S_2$ are also connected to differential inputs of a second phase sensitive rectifier 404, that will create the same difference between the signals $s_1$ and $s_2$, on the sensor electrodes $S_1$, $S_2$, again shown as "$s_1-s_2$", see FIG. 5g. It is however controlled by a control signal phase d, see FIG. 5i, which is basically identical to drive signal phase b. When the control signal phase d is positive, the second phase sensitive rectifier 404 will transfer the signal "$s_1-s_2$" non-inverted; when the control phase d is negative, it is transferred inverted. The resulting output signal on output line 402, shown as "cos" in FIG. 5k, will, with the code disc position shown, basically be a square wave having a frequency twice the frequency of the drive signal phases a, a', b, b' and a zero DC level.

After low pass filtering, not shown, to suppress the high frequency content, the output signals of the phase sensitive rectifiers 403, 404 will have two DC levels as long as the code disc is static. In the case where the encoder disc rotates with a constant speed, the signals may be two sine waves with 90° phase difference. The signal shape will depend on the geometry of the code disc and on the track thereof. The shapes shown in the figures give signals close to sinusoidal.

FIGS. 5e and 5f may be considered to illustrate the electric charge injected in the sensor electrodes $S_1$, $S_2$. In the case where they are connected to a charge amplifier, their voltages will remain close to zero. It can also be noted that the sum of the two signals in FIGS. 5e and 5f is equal to zero and that all signal processing uses the difference "$s_1-s_2$". Any DC offsets that may appear in the signal processing electronic circuits will therefore basically balance out each other. This may permit cost savings, especially if the parts connected to the sensor electrodes are to operate in temperatures up to 150° C.

Figure 6:
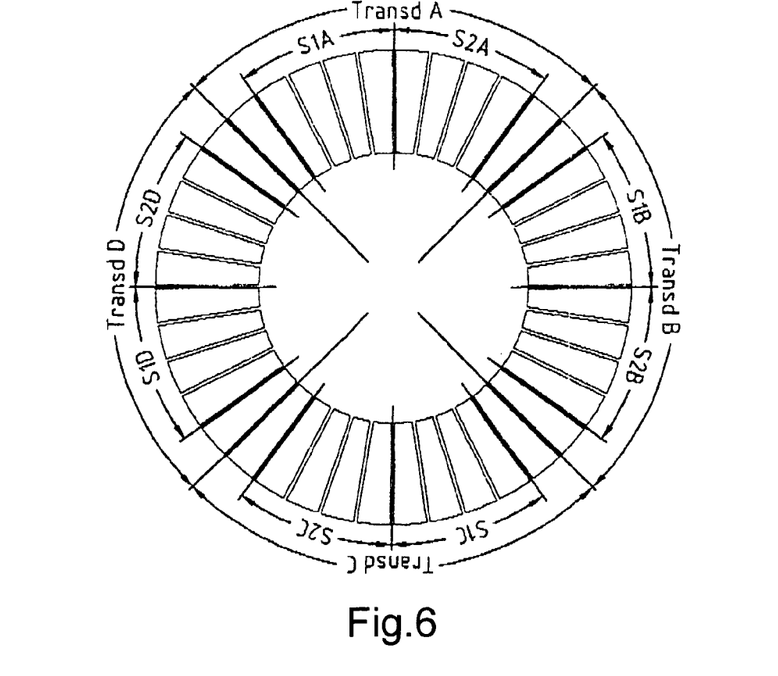
FIG. 6 is a diagram of a transmitter set suitable for four redundant encoders.

FIG. 6 shows transmitter electrodes suitable for four redundant encoders A, B, C and D. Unlike the system shown in FIGS. 1–3 which has 6×10 segments on the transmitter disc or board, there are 4×10 segments that can be used as four groups, each including 8 transmitter electrodes enclosed by two grounded segments like the electrodes 105, 106 (G) in FIG. 1. The purpose of the grounded segments is to reduce the coupling e.g. between the second sensor electrode S2D of the encoder D and the transmitter electrodes facing the first sensor electrode S1A of the adjacent encoder A.

As the net charge from each transducer to the code disc is substantially zero, the corresponding four position transducers can have a common metal disc. The four position transducers can be galvanically completely insulated from each other or have a common ground but separate power supplies, oscillators, etc.

The primary signals used in the encoders have frequencies in the magnitude of order of 20 MHz. This is far higher than the expected frequency of the output signals. The transmitter set shown in FIG. 6 assumes a 10 period per turn code disc, see for example FIG. 8. Assuming a speed of 6000 rpm, the code disc will make 100 rotations per second and the output signal frequency will be 1 kHz. If all four encoders each have a separate clock oscillator with basically the same oscillator frequency, there is a possibility that the oscillator frequencies will be close enough to create interference products in the kHz range. To avoid this, it is recommendable to have the oscillator frequencies separated by some MHz.

There is preferably one period of the code disc for every 4 transmitter electrodes. Therefore a set of 40 electrodes as shown in FIG. 6 require a 10 period code disc. The 40 electrodes can then be connected as 4 groups each having 8 transmitters and 2 grounded end shields for 4 separated encoders A, B, C and D or for two separated encoders, one using electrode sets A and C and the other using sets B and D. For a single channel encoder, 5 sets of 8 electrodes each can be connected to the same driver/encoder electronic circuits.

Figure 7:
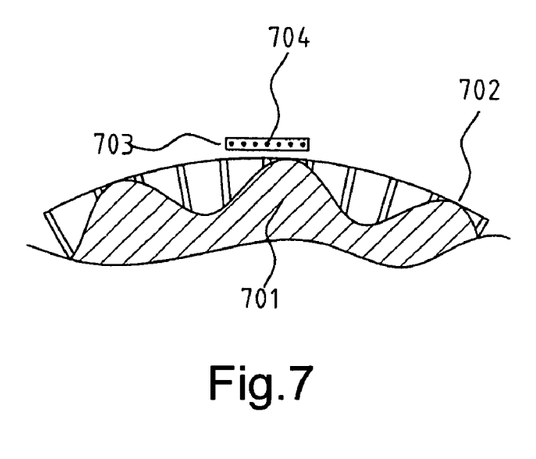
FIG. 7 is a principle drawing similar to FIG. 2 showing an example of unwanted capacitive coupling in an encoder.

FIG. 7 shows an example of unwanted capacitive coupling in an encoder as of FIG. 2. A metal mask code disc 701 has protruding parts like 702 that is passing close to a connector 703 that carries drive signal phases a, a', b and b' to the transmitting electrodes. The capacitance between a connector pin like 704 and the sensor electrodes like 301 will vary with the position of the code disc 701, the code disc acting as an intermediate coupling electrode. The electrical charge injected to the two sensors 301 and 302 will therefore be affected not only by the code disc and the intended transmitter electrodes like 101 and 103 but also by a not intended transmitting electrode like the connector pin 704.

Figure 8:
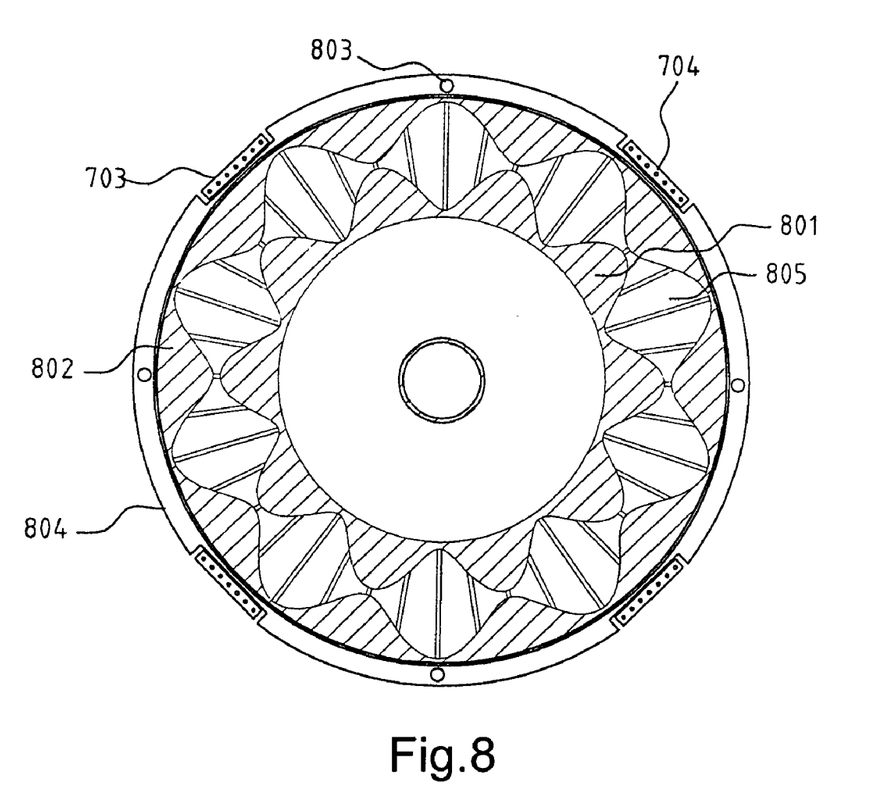
FIG. 8 is a schematic showing the transmitters of FIG. 6 shaded by a conductive modulator disc having two conducting surfaces and an outer screen.

FIG. 8 shows two arrangements to reduce the capacitive coupling to not intended transmitting electrodes and to other objects such as screws and other grounded, conducting objects.

The code disc shown has two electrically conducting areas 801 and 802. The code disc area 802 closest to the unintended electrodes in the connectors like 703 or an assembly screw in a hole 803 has a circular shape, i.e. the outer periphery or contour of the radially outermost electrically conducting area is circular, corresponding to a full circle, thus giving a capacitance between the code disc conductor 802 and the connector pins like 704 that is basically independent of the rotational position of the code disc.

The outermost electrically conducting part 802 does not have to be electrically connected to anything as the electrical charge injected to it cancels out. The same is true for the inner electrically conducting part 801.

FIG. 8 also shows another arrangement to reduce the code disc position dependent capacitive coupling to not intended objects. An electrically conductive screen ring or shielding ring 804 has a cylindrical inner surface directed towards the code disc. Such a shield can be used with electrically conductive code discs of any shape and with non-conductive code discs made of a material having a high dielectric constant.

Figure 9:
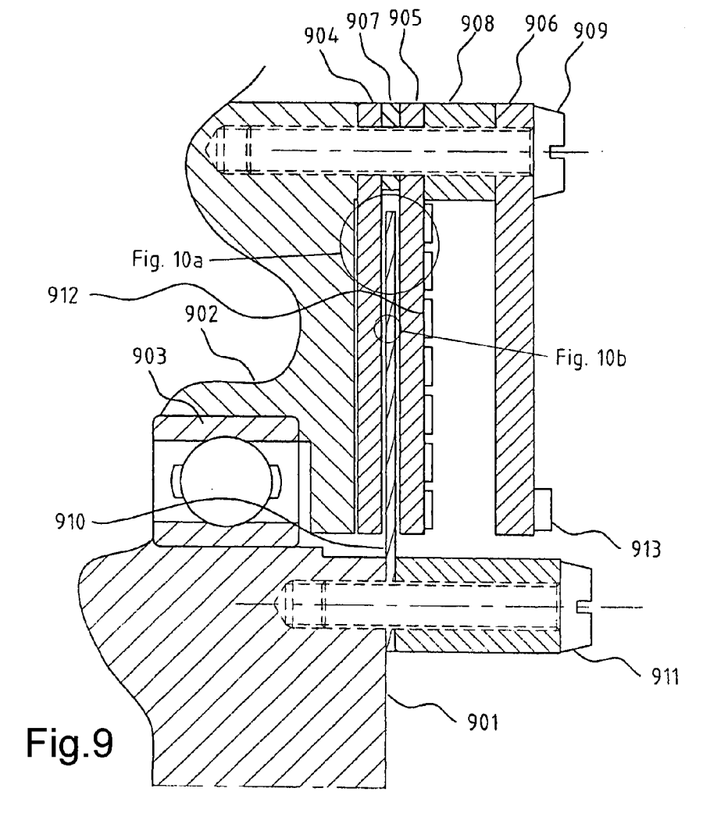
FIG. 9 is a side view of an encoder in a motor system.

FIG. 9 shows a side view of a position encoder system built into a motor system. It shows a motor shaft 901, a bearing 903 thereof and a motor static frame 902. The transmitter electrode disc 904 is assembled to the motor frame 902. The transmitter electrodes face an air gap to the code disc 910. The code disc faces on the other side a sensor board 905 that carries the sensor electrodes and preferably also the input stage of the sensor electronic circuits. The remaining signal processing electronic circuits are located on a board 906 kept with an air gap to the sensor board 905 obtained by arranging a distance element 908. This air gap reduces the capacitance between the sensor electrodes and a ground plane of the processing board 906 facing the sensor part, i.e. located on the left side of the processing board in the figure. To avoid that unintended objects affect the sensor electrodes and/or the code disc, the distance element 907 for the code disc has a conductive cylindrical inner surface, facing the periphery of the code disc and concentric with the shaft 901 as described for item 804 in FIG. 8. Drainage holes, not visible in FIG. 9, through the sensor board or sensor disc 905 permit condensed water to escape.

The encoder disc 910 is schematically shown assembled on the shaft 901 by screws 911 and the static part is kept together by screws 909. There are many established ways to assemble transducer parts to motor rotors and frames. Screws have been shown in the embodiment to stress the importance of an angularly very rigid assembly in environments where ice or very cold oil may have entered into the air gaps in the encoder.

For applications in which the motor system may be affected by condensing water, the boards 904 and 905 can be supplied with heaters 912 to permit the temperature to be sufficiently higher than the dew point of the surrounding air, such heaters being of the electrical resistive type including one or more electrical resistors or resistive paths. Alternatively, the motor may be initially heated by electrical currents selected to give no net torque to the motor. Such heating can evaporate condensing water between the encoder disc 910 and the transmitter/sensor boards 904, 905. It can also evaporate ice in the motor air gap if required. FIG. 9 shows a combination. The transmitter board 904 is kept very close to the motor frame 902, permitting heat from the motor windings to reach the transmitter board 904. The sensor board 905 is equipped with heating resistors 912. They are preferably arranged behind the grounded electrodes (G) such as 304 and 305 in order to reduce the capacitance between the resistors and the sensor electrodes such as 1002, 301 and 302.

By some additional means the system can obtain information on the angular position within one whole turn. Such means can include an additional encoder track or some crude device such as an opto reflector 913 mounted on the processing board 906 to detect the screws 911 securing the encoder disc. If the number of protruding screws like 911 is equal to m and the periods on the code disc are n and n and m has no common factor, i.e. are relatively prime, the angular position can be determined as soon as a screw like 911 has been detected. For example, for a 10 period code disc, the number of protruding screws can be 1, 3, 7 or 9.

Figure 10A:
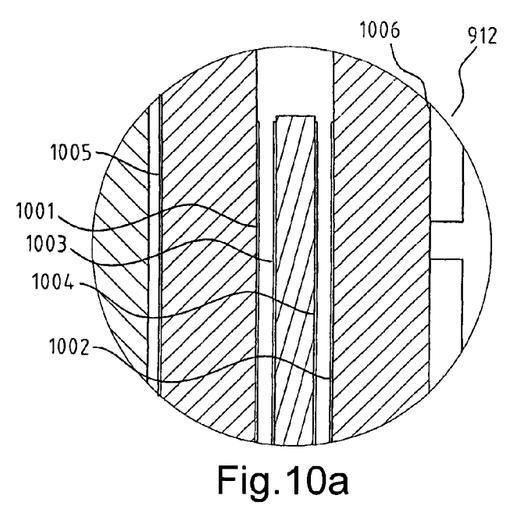
FIG. 10*a* is fragmentary view showing in an enlarged scale the region at the periphery of the encoder disc including electrode surfaces of the encoder of FIG. 9.

FIG. 10*a* is an enlargement of the disc part of FIG. 9. It shows a transmitter electrode 1001 corresponding to the electrodes 101–104 of FIG. 1, a sensor electrode 1002 corresponding to the electrodes 301, 302 of FIG. 3 and electrically conductive mask surfaces 1003, 1004 like 802 of FIG. 8, the electrically conductive surfaces located on opposite sides or surfaces of the encoders disc. To reduce interference the transmitter board 904 may have a screen or electrically shielding surface 1005 on the side directed towards the motor frame. The surface 1006 of the receiver board 905 facing the processing board 906, the right surface in the figure, should preferably have no electrical conductors, in order to keep the capacitance between sensor electrodes 1002 and other electrically conducting parts as low as possible, or have electrodes of the same shape as the sensor electrodes but electrically floating, in order to reduce temperature stresses, such bimetallic stress, on the sensor board.

The distance between the sensor and processing boards 905, 906 should be large enough to reduce the capacitance between the sensor electrodes 1002 and the processor board 906. It can be filled with air or a compound with a preferably low thermal conductivity and low dielectric constant.

The transmitter, sensor and processor boards 904, 905, 906 are interconnected, for example by connectors like 703 of FIG. 8.

Figure 10B:
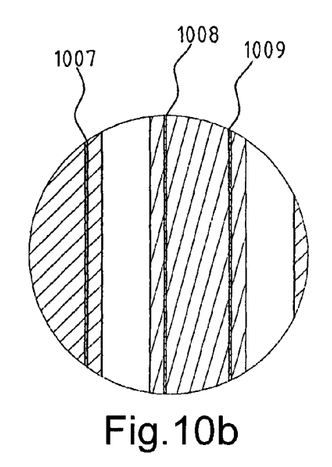
FIG. 10*b* is fragmentary view showing in an enlarged scale the region at the periphery of the encoder disc including buried electrodes for the encoder of FIG. 9.

FIG. 10*b* shows an alternative arrangement in which the electrode surfaces are made as internal layers in multilayer printed circuit boards. This provides protection against corrosion and against mechanical damage such as in the case where it has occurred that a sharp object has entered in the air gaps between the rotating encoder disc 910 and the stationary transmitter and sensor boards 904, 905. The surface electrodes 1001, 1003 and 1004 of FIG. 10*a* are then replaced with buried electrodes 1007, 1008 and 1009, respectively, as seen in FIG. 10*b*. A transmitter board of this design can be placed in contact with the motor frame without arranging any air gap.

If the four encoders of FIG. 6 are used in pairs with their signals added, the effects of radial movements of the encoder disc will be substantially cancelled out. This can for example be arranged by having two processor systems, each reading one pair of opposite placed encoders like the detector devices A and C or the detector devices B and D of FIG. 6. Each processor system can sample the signals like those appearing on the output terminals 401 and 402 directly and add the obtained position values digitally. The integrity of the total position transducer system can be monitored by simply comparing the positions derived from the two opposite position transducers. As long as the derived positions are substantially equal to each other, both position transducers can be assumed to work properly. In case they are not, it is very often possible to find the faulty position transducer since an operating transducer should give "sin" and "cos" signals that have the same square sum. In the case where the signals from one transducer give the expected square sum and the signals from the other one do not, the first one should be used.

A faulty position transducer, also called detector device, should preferably have its supply voltage disabled because, in order to obtain the electrical charge balance described above, it is assumed that all drive signal phases a, a', b and b' have the right phase and amplitude. If an error has occurred, incorrect signals from one transducer may to some extent interfere with the signals of the remaining transducers.

Figure 11:
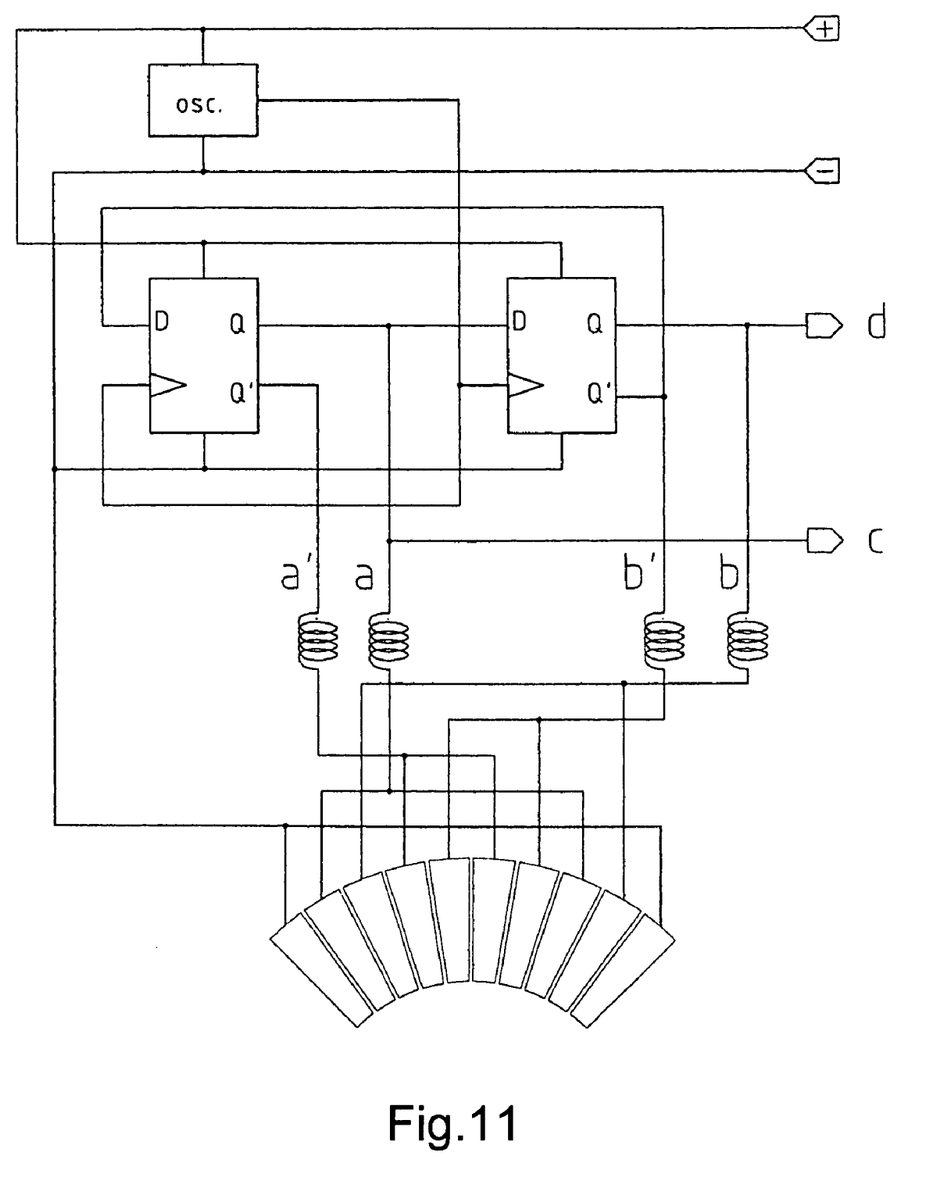
FIG. 11 is a schematic of an example of a clock generator for the device of FIG. 4.

FIG. 11 shows an example of a clock generating system suitable for the electrical circuit of FIG. 4. By arranging the signal generator as a inverted feedback two stage shift register in the illustrated way, most electronic failures would cause the clock generating system to produce DC signals to the transmitter electrodes, thus giving no capacitive effects on the corresponding sensor electrodes or code disc. The inductances shown are provided to reduce ringing on the electrodes. Systems having complete galvanic insulation between the individual transducers or detector devices should preferably have the grounded segments G adjacent to the sensor electrodes of one transducer connected to the ground of that transducer as shown in FIG. 11.

Figure 12:
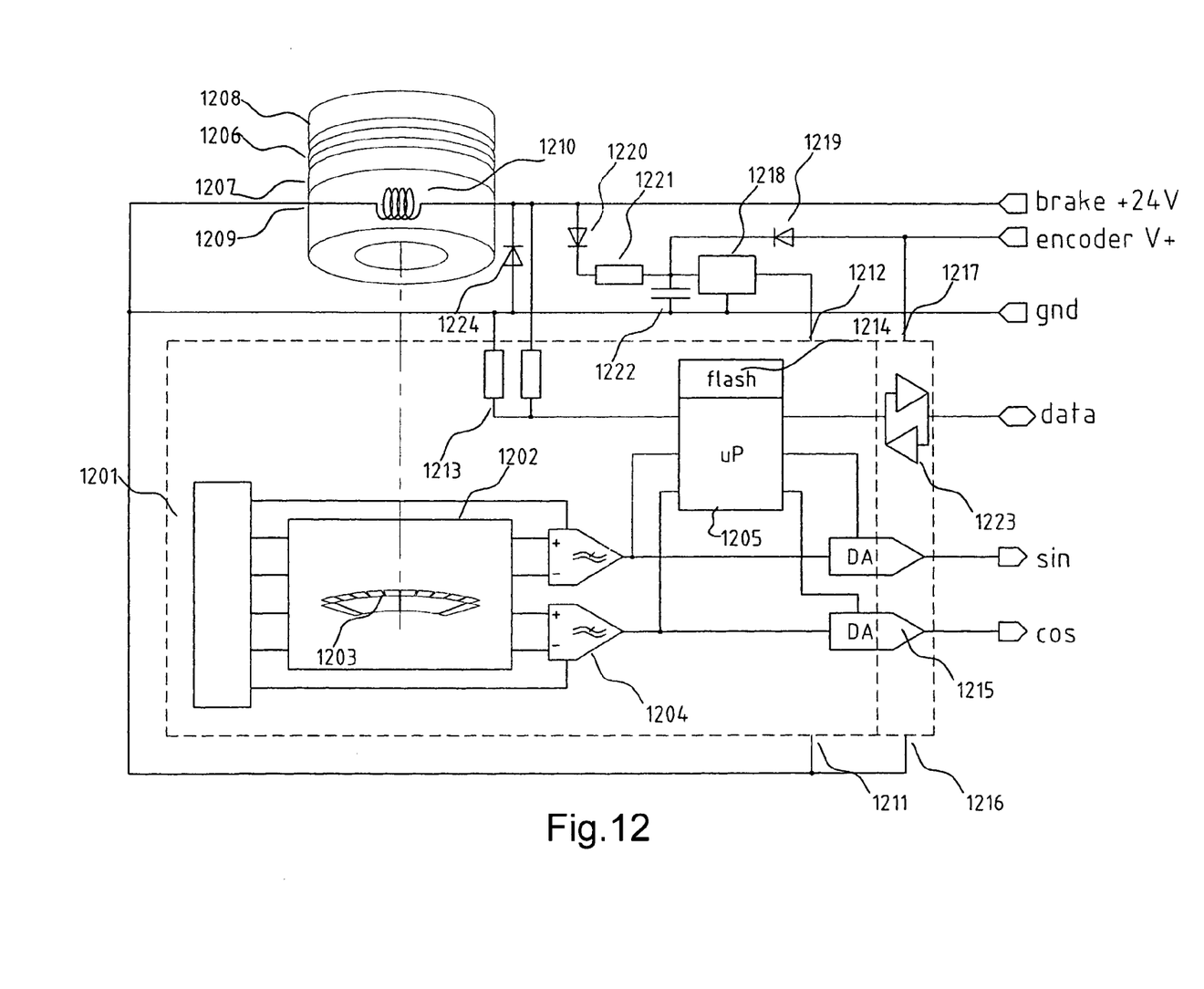
FIG. 12 is a principle drawing of circuitry replacing index tracks and multi turn mechanics.

FIG. 12 shows an arrangement to replace the common index tracks and gear boxes used to register multiple turns. It contains as a basic part an encoder system or an encoder head having a signal generator 1201 that may be similar to that shown in FIG. 11, a capacitive modulator or detector device 1202, 1203 as described with reference to the figures above and two demodulators/low pass filters 1204 generating sine and cosine signals.

These signals are read by a microprocessor or signal processor 1205. It is known in prior art, see e.g. the cited U.S. Pat. No. 6,084,234 for Stridsberg, that a processor like 1205 can follow the movements of the code disc during normal operation and in a low power mode can energize the detector devices 1201, 1202, 1204 with a low duty cycle using for example a battery or a super capacitor supported energy supply.

Batteries, super capacitors and other energy supplies that can be built into a motor system have a limited energy content and cannot easily supply the power necessary for a low power system for long periods of time. FIG. 12 shows an improved arrangement for motor systems that have a brake with active release. Such brakes will lock the motor shaft until an active release command is given. Such a release command is commonly arranged as a 24 V DC voltage. Such a brake may have a rotor disc 1206 that in the absence of a release command is pressed between an axially moving part 1207 and a static disc 1208, the part 1207 being pressed axially upwards by springs, not shown. The brake is shown in its released state in which the axially movable part 1207 has been moved downwards until it is adjacent to a magnet coil carrier part 1209 including a magnet coil 1210.

Assuming that the motor rotor and the code disc cannot move if there is not a sufficient voltage over the coil 1210 to attract part 1207 against the force given by the springs, there is no need to have a low duty cycle control of the position of code disc when the voltage over the brake coil 1210 is below a certain value. The encoder and its processor 1205 will get power, on power lines 1211, 1212, if either the system power is supplying "encoder V+" or the brake coil voltage is up. In normal operation the brake coil is only energized after the system power has been switched on, and the brake coil current will be switched off before the system power is down. If a service technician would release the brake by connecting a separate supply to the brake, the encoder and processor part will be activated. The processor 1205 can monitor the brake voltage over a line 1213, wait until the brake has been locked and the movement stopped and can then store the position, including the whole number of turns moved, in a non-volatile memory 1214.

At system power up, the processor will find the previous position in memory 1214 and can verify this against the position measured using the parts 1201–1204. A high level control system, not shown, can use the data channel through a buffer 1223 to get the position data from the processor 1205, including the number of whole turns. The processor 1205 can perform other tasks, such as adjusting the signal amplitude by setting the gain of two multiplying DA-converters like 1215. They can be used to compensate for system gain variations due to temperature and/or to replace trim potentiometers, the setting being stored in the memory 1214 during a motor system final test. It can also read temperature and, if required, increase it using resistors, not shown in FIG. 12. The data in the memory 1214 can in the conventional manner contain data on motor type, offset between encoder position and commutation angles, etc.

The power supply system shown is only intended as an example, as many alternative solutions are obvious. The buffers and drivers to the higher order control system are fed by the supply voltage 1216, 1217, which is fed by the "encoder V+" supply only. The core system power 1211, 1212 is supplied by a stabilizer 1218 that is supplied either by the encoder V+ supply over the diode 1219 or from the brake +24 V over the diode 1220 and a resistor 1221, in order to avoid that the brake supply will be disturbed by the capacitor 1222. The diode 1224 is to eliminate the potential high voltage peak when the brake supply is switched off.

For systems in which the number of encoder periods is an integer fraction of the number of motor pole pairs, the encoder data can directly be used for commutation purposes.

The electronic multiturn arrangement shown in FIG. 12 can be used with any encoder principle such as a resolver or optical encoder.

By adding some means to obtain an angular position indicator for one turn, the system can use calibration data stored in the memory 1214 to use measured data on signal shape, wobbling etc. in the primary signals from detectors like 1204 to obtain a more linear relation between real angular movement and estimated position as described in the cited U.S. Pat. No. 6,191,415.

By having the electronic parts, i.e. oscillators and other heat sensitive parts, placed at a some distance from the electrodes, the transmitter and sensor electrodes can be located in a very hot area thermally close to the motor windings and the electronic circuits in a less hot part of the motor enclosure. The phase sensitive rectifier front stages that preferably should be assembled close to the sensor electrodes can be made of commonly available components that operate at temperatures close to 150° C.

Figure 13:
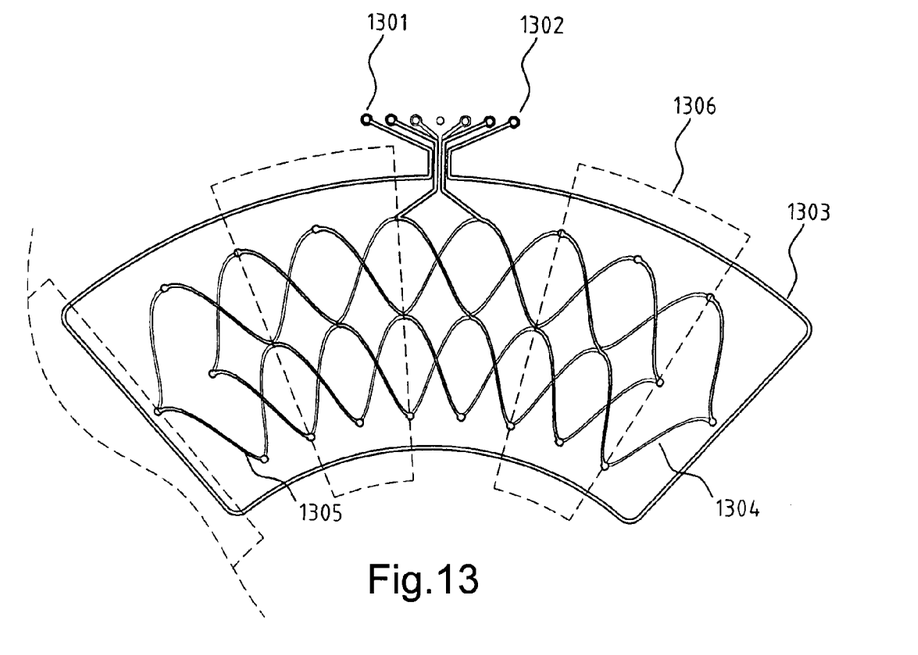
FIG. 13 is a principle drawing of a transmitter and two sensor coils for one of four electrically independent, inductive encoders.

FIG. 13 is a principle drawing of a transmitter and two sensor coils for one of four electrically independent inductive position encoders. On connector pins 1301 and 1302 an AC current is provided flowing through a flat coil 1303, which can be made as a pattern of electrically conducting paths on a multilayer printed circuit board. The excitation coil 1303 will cause a field that inside the coil will be basically perpendicular to the board. Inside the coil 1303 there are two sensor coils 1304 and 1305.

Figure 14:
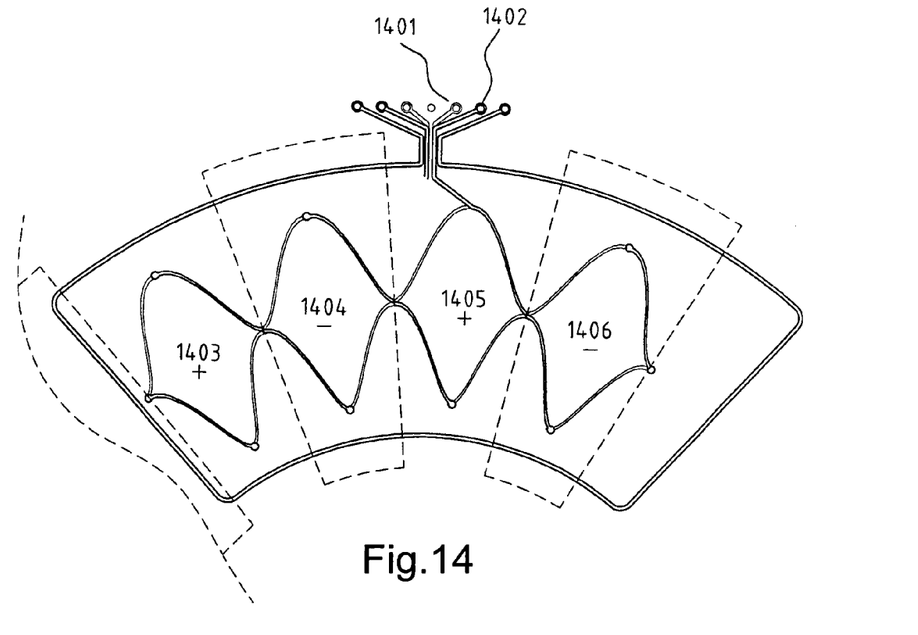
FIG. 14 is a principle drawing similar to FIG. 13 in which only one sensor coil is shown.

FIG. 14 is a simplified version of FIG. 13 in which only one sensor coil 1305 is shown. Conductors in the printed circuit board layer most close to the reader is drawn in thicker lines and conductors in another layer is drawn in thinner lines. Flux changes in the sensor coil 1305 will cause an emf that can be sensed on terminals 1401 and 1402. A flux change that creates a positive emf in the coil loops 1403 and 1405 will cause a negative emf in loops 1404 and 1406. As the four coil loops are connected in series, a homogenous flux change will give no net emf.

A rotating encoder disc has metal areas 1306 such as copper surfaces in, or on, a printed circuit board disc. A changing magnetic field passing perpendicularly through a conducting surface will cause eddy currents that weaken the rate of change of the magnetic field. Therefore, for the encoder disc in the position shown in FIGS. 13 and 14, there will be a larger flux change in coil loops 1403 and 1405 than in loops 1404 and 1406, giving a positive net voltage over the terminals 1401 and 1402. If the code disc is moved half a period, there will be a negative net voltage over the terminals 1401, 1402. For the code disc position shown, there will be no net voltage in the coil 1304 since all four coil loops are covered to 50% by the encoder disc.

The variations of the encoder permeability can be obtained by copper surfaces like 1306 of the type used on printed circuit boards causing eddy currents that reduce the effective permeability at high frequencies to be lower that of air. The code disc can also contain materials such as a ferrite with a permeability that is higher than that of air even at high frequencies. It can be observed that ferrites and iron sheet have both a high permeability at very low frequencies, but an iron sheet will at high frequencies also cause eddy currents. A combination is possible, having for example electrically conducting copper areas like 1306 with thin ferrite areas in the sectors between the metal sectors, but it is difficult to produce such a structure with the required robustness and cost.

As for the capacitive position transducers shown in FIGS. 1–10, several inductive position transducers as shown in FIG. 13 can be arranged on the same board set. They can be galvanically insulated from each other or have a common ground. In the same manner as described for FIG. 6, the four groups can be connected as four separate position encoders or as two position encoders each using one pair of coil sets, etc. An error in the operation of the electric circuits of one encoder will not affect the remaining encoders. The basic electronic circuits can also be similar, with the exception that the inductive encoder shown only has one phase to drive the excitation coil and the phase sensitive rectifiers. As is the case with the capacitive encoders shown, the code disc will not cause electric faults in one encoder to affect the signals from other encoders on the same boards.

The different encoders shown use different sectors of the available board space and the whole radial width of the available board space. An obvious alternative is to let each encoder use a fraction of the radial width over a whole turn. This may be advantageous for a system including two independent encoders, but would give very small distances for a hex encoder system as shown in FIG. 1. The electronic multiturn arrangement shown in FIG. 12 can be used with any encoder principle such as a resolver or optical encoder.

Figure 15:
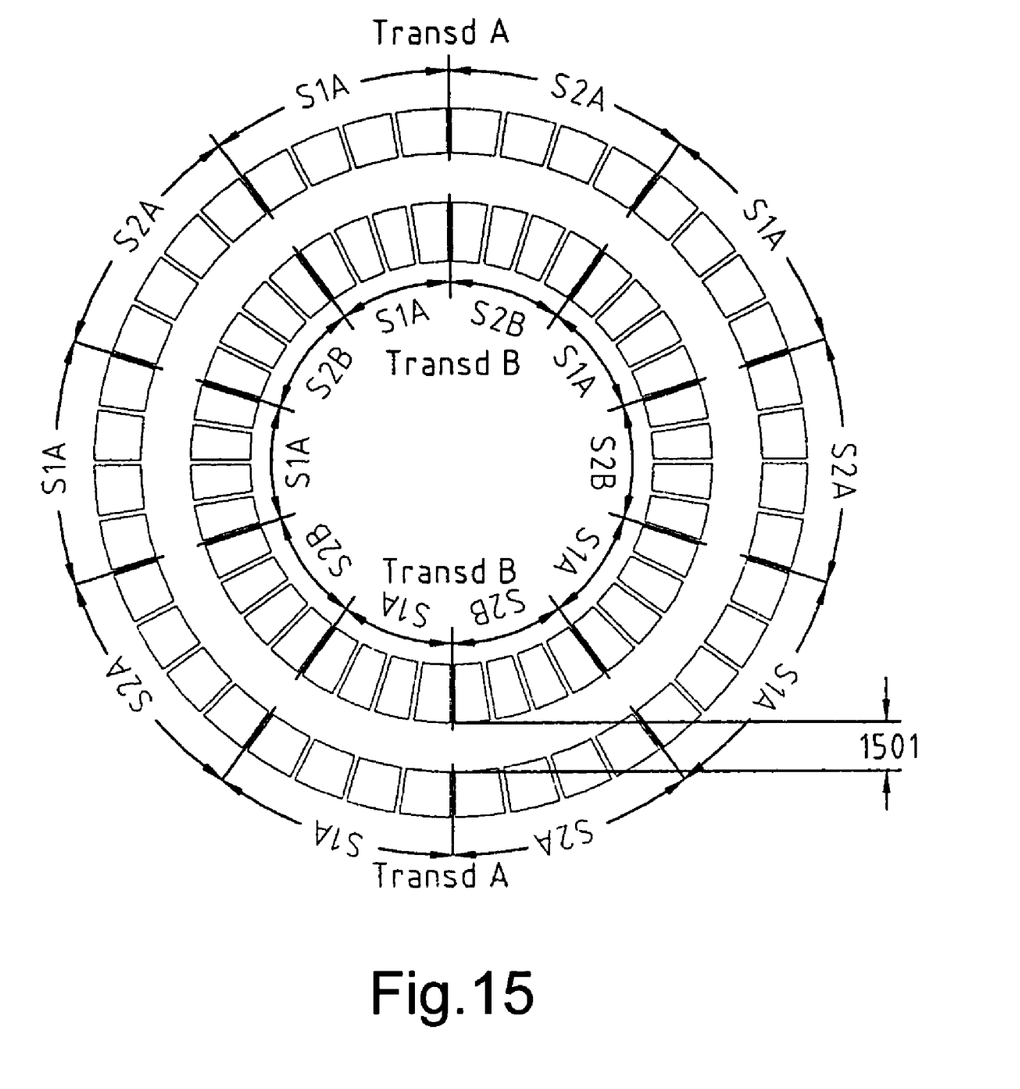
FIG. 15 is a principle drawing of a transmitter electrode set suitable for two concentric, redundant encoders.

The different encoders shown above use different sectors of the available board space and the whole radial width of the available board space. An obvious alternative is to let each encoder use a fraction of the radial width over a whole turn as shown in FIG. 15. This may be advantageous particularly for systems including only two independent encoders. The distance 1501 between the different encoders will however be smaller than the corresponding distance for the angular section designs, and would be very small for a hex encoder system as shown in FIG. 1.

For angular sector transducers that do not need any redundancy or for concentric redundant encoders the grounded electrodes G can be omitted. The transmitter electrodes being connected to the drive signals according to the connection sequence . . . g-a-b-a'-b'-a'-b'-a-b-g . . . is then replaced with . . . a-b-a'-b'-a'-b'-a-b . . . as shown in FIG. 15 where "g" denotes the ground potential. The sensor electrodes . . . G-$S_1$-$S_2$-G . . . are then replaced with . . . $S_1$-$S_2$. . . .

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A position transducer including:
    an encoder disc having a track including variations in the electrical and/or magnetic properties of the disk or of a material in or upon the disc,
    at least two detector devices for reading the track for producing position signals, and
    at least one control unit for receiving the position signals, wherein
    the at least two detector devices and the encoder disc are arranged in such a way that the interaction between one of the at least detector devices and the encoder disc will not affect the interaction between another of the at least two detector devices and the encoder disc, and
    the at least two detector devices are arranged so that one of the at least two detector devices can provide position signals to the control unit even if another of the at least two detector devices ceases to operate.

2. The position transducer of claim 1, wherein each of the at least two detector devices covers sectors of equal angular magnitude, the sectors located next to or adjacent to each other.

3. The position transducer of claim 2, wherein each of the sectors has an angle of 90°.

4. The position transducer of claim 2, wherein each of the sectors has an angle of 60°.

5. The position transducer of claim 1, wherein each of the at least two detector devices covers a whole turn of the track.

6. The position transducer of claim 1, wherein each of the at least two detector devices is arranged to read variations in capacitance of the respective one of the at least two detector devices, the capacitance depending on the position of the encoder disc.

7. The position transducer of claim 1, wherein each of the at least two detector devices is arranged to read variations in capacitances between at least one sensor electrode and a set of transmitter electrodes, the transmitter electrodes connected to different electrical phases of a multiphase electrical signal and the capacitances depending on the position of the encoder disc.

8. The position transducer of claim 1, wherein each of the at least two detector devices have at least one set of two sensor electrodes, each sensor electrode being capacitively coupled to a set of transmitter electrodes, the transmitter electrodes connected to different electrical phases of a multiphase electrical signal, the capacitive coupling depending on the position of the encoder disc.

9. The position transducer of claim 8, wherein the transmit electrodes and the encoder disc are arranged in such a way that for all positions of the encoder disc, the capacitive coupling between a first transmitter electrode and one of the sensor electrodes of a sensor electrode pair is substantially equal to the capacitance between the other of the sensor electrodes of the same sensor electrode pair and a second transmitter electrode connected to an electrical phase being 180° out of phase in relation to an electrical phase connected first transmitter electrode.

10. The position transducer of claim 1, wherein the electrical and/or magnetic property of the encoder disc is the dielectric constant of the material of the encoder disk and the variations include variations of the radius of the encoder disc.

11. The position transducer of claim 1, wherein the electrical and/or magnetic property of the encoder disc is the dielectric constant of the material of the encoder disk and the variations include variations of the thickness of the encoder disc.

12. The position transducer of claim 1, wherein the electrical property and/or magnetic of the encoder disk includes variations in the surface area of an electrically conducting portion of the encoder disc.

13. The position transducer of claim 1, wherein the encoder disc is made of a material having a high dielectric constant and the electrical and/or magnetic property of the encoder disk includes variations in the surface area of at least one electrically conducting portion of the encoder disc.

14. The position transducer of claim 1, wherein the electrical and/or magnetic property of the encoder disc includes an electrically conducting surface or area or electrically conducting surfaces or areas in or on the encoder disk and the variations includes patterns of electrically conducting and electrically not conducting material.

15. The position transducer of any of claims 12 to 14 further comprising transmitter electrodes, wherein the transmitter electrodes and the encoder disc are arranged in such a way that for all positions of the encoder disc, the capacitive coupling between one of the transmitter electrodes and each of electrically conducting portions of the encoder disc is substantially equal to the capacitive coupling between the same electrically conducting portion of the encoder disc and another of the transmitter electrodes that is connected to an electrical phase 180°0 out of phase in relation to an electrical phase connected to said one of transmitter electrodes and is part of the same detector device.

16. The position transducer of claim 1, wherein the electrical anchor magnetic property of the encoder disk includes variations in the magnetic permeability of the encoder disc caused by materials with different magnetic permeability at low frequencies.

17. The position transducer of claim 1, wherein the electrical property and/or magnetic of the encoder disk includes variations in the magnetic permeability of the encoder disc due to eddy current losses in electrically conducting materials of the code disc.

18. The position transducer of claim 1, wherein each of the at least two detector devices has an energizing coil and two sensor coils and are arranged to read variations in, for the respective one of the at least two detector devices, the coupled inductances between the energizing coil and the two sensor coils, these inductances being dependent on the position of the encoder disc.

19. The position transducer of claim 1 further including a heater to heat static or stationary parts of the position transducer to melt ice or vaporize water formed on the encoder disc, on the at least two detector devices or in an air gap between them.

20. The position transducer of claim 19, wherein the heater includes resistive heater elements located at a board carrying components of the at least two detector devices and placed close to the encoder disc.

21. The position transducer of claim 1 for controlling an electric motor having a shaft, the angular position of which is directly related to the angular position of the encoder disc, wherein the at least two detector devices and the track are arranged so that the position signals provided by the at least two detector devices include information sufficient for commutating the electric motor.

22. The position transducer of claim 1 for controlling an electric motor having a shaft, the angular position of which is directly related to the angular position of the encoder disc, wherein the number of encoder periods of the encoder disc is an integer fraction of the number of pole pairs of the electric motor.

23. The position transducer of claim 1, wherein the at least two detector devices have a substantially identical structure.

24. The position transducer of claim 1, wherein the at least two detector devices are adapted to provide position signals of substantially the same kind.

25. The position transducer of claim 1, wherein the at least two detector devices are adapted to provide position signals including substantially the same kind of angular position information.

* * * * *